(12) United States Patent
Connor et al.

(10) Patent No.: US 7,867,311 B1
(45) Date of Patent: Jan. 11, 2011

(54) FILTER ASSEMBLY WITH TRAPPED AUXILIARY FLOW COMPONENT

(75) Inventors: Michael J. Connor, Stoughton, WI (US); Robert A. Bannister, Stoughton, WI (US); Jessie A. Knight, Stoughton, WI (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 899 days.

(21) Appl. No.: 11/560,417

(22) Filed: Nov. 16, 2006

(51) Int. Cl.
  *B01D 59/50* (2006.01)
(52) U.S. Cl. ............ 55/482; 55/385.2; 55/320; 55/446; 55/501; 55/DIG. 20; 123/198 E
(58) Field of Classification Search .......... 55/385.2, 55/418, 446, 482, DIG. 20, 385.3, 487, 501, 55/DIG. 28, 320, 327, 331, 330; 123/184.53, 123/509, 198 E; 210/748, 771, 807, 290, 210/909
See application file for complete search history.

(56) References Cited

U.S. PATENT DOCUMENTS

| | | | | |
|---|---|---|---|---|
| 2,973,832 A * | 3/1961 | Cook et al. ............... 55/385.1 |
| 4,243,397 A * | 1/1981 | Tokar et al. ................ 55/487 |
| 4,447,332 A * | 5/1984 | Crisman et al. ........ 210/748.13 |
| 6,109,216 A * | 8/2000 | Reynolds et al. ......... 122/13.01 |
| 6,494,189 B1 | 12/2002 | Chu et al. |
| 6,540,046 B1 | 4/2003 | Schuhmacher et al. |
| 6,632,261 B2 * | 10/2003 | Hamilton et al. .............. 55/418 |
| 6,705,267 B1 | 3/2004 | Westerbeke, Jr. et al. |
| 2002/0040569 A1 * | 4/2002 | Reinhold ..................... 55/498 |
| 2002/0124814 A1 * | 9/2002 | Stretch et al. ............. 122/14.1 |
| 2004/0134171 A1 * | 7/2004 | Scott et al. ................... 55/482 |

* cited by examiner

*Primary Examiner*—Jason M Greene
*Assistant Examiner*—Karla Hawkins
(74) *Attorney, Agent, or Firm*—Andrus, Sceales, Starke & Sawall, LLP; J. Bruce Schelkopf (57) ABSTRACT

A filter assembly, including an air cleaner, has an auxiliary flow component having a mounting flange extending into a gap between a housing port and a conduit in trapped relation to mount the auxiliary flow component to the port and the conduit at the interface thereof. The port and conduit are mounted to each other with the mounting flange therebetween in permanently captured sandwiched relation, without detachment fasteners.

21 Claims, 9 Drawing Sheets

FILTER ASSEMBLY WITH TRAPPED AUXILIARY FLOW COMPONENT

BACKGROUND AND SUMMARY

The invention relates to filter assemblies, and more particularly to a filter assembly with a trapped auxiliary flow component.

The invention arose during continuing development efforts directed toward simplified, reliable, cost-effective flame arrestor systems for the air intake of an internal combustion engine to protect an air filter element in the case of engine backfire. The flame arrestor suppresses or deflects or otherwise arrests the flamefront flowing from the engine back to the air filter element, to prevent damage to the filter medium. These flame arrestors are typically mounted with rivets or bolts or other detachment fasteners using a separate mounting and fastening system to retain them in the air cleaner assembly.

In one embodiment of the present invention, an integrally captured flame arrestor system provides an innovative packaging of the flame arrestor, eliminating the need for fasteners, reducing the number of parts, and simplifying the assembly process including reducing the number of assembly steps, all resulting in both improved reliability and lower cost.

The invention has further application to the mounting of auxiliary flow components in filter assemblies where it is desired to provide a simplified, reliable, cost-effective mounting system.

DETAILED DESCRIPTION

Figure 1:
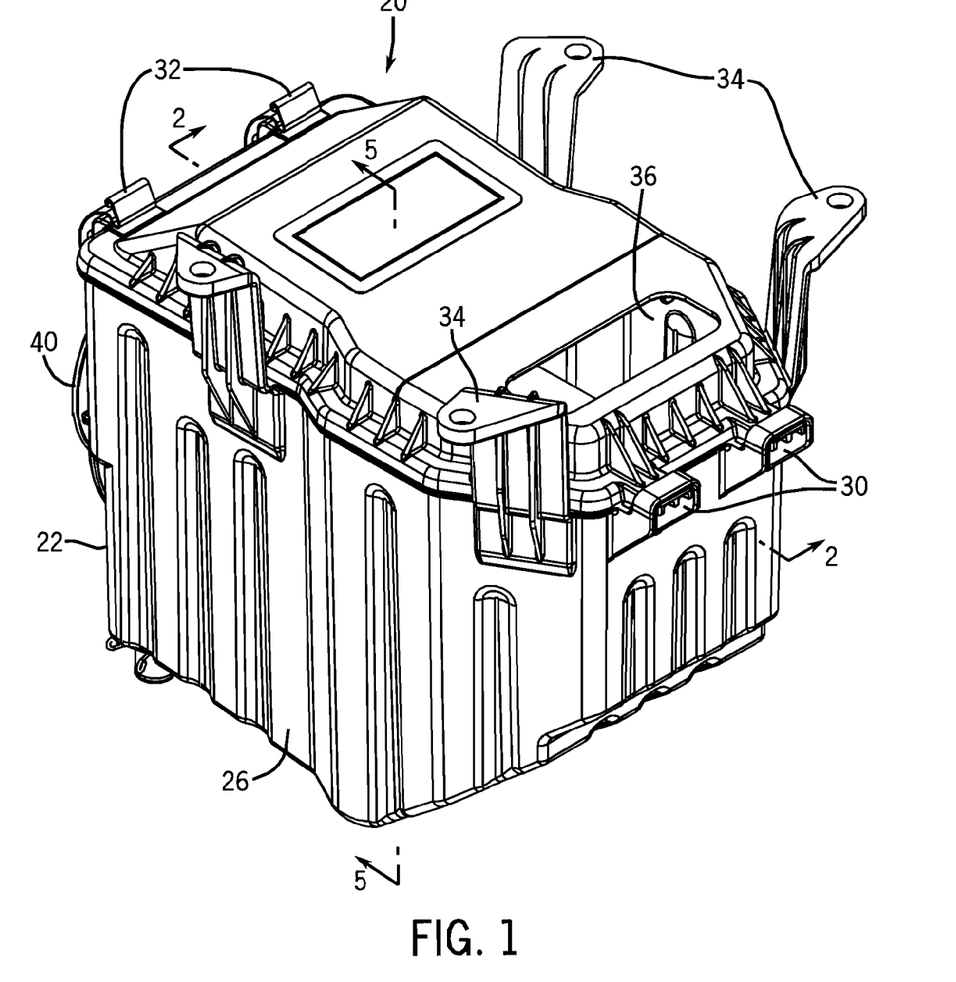
FIG. 1 is a perspective view of a filter assembly in accordance with the invention.
Figure 2:
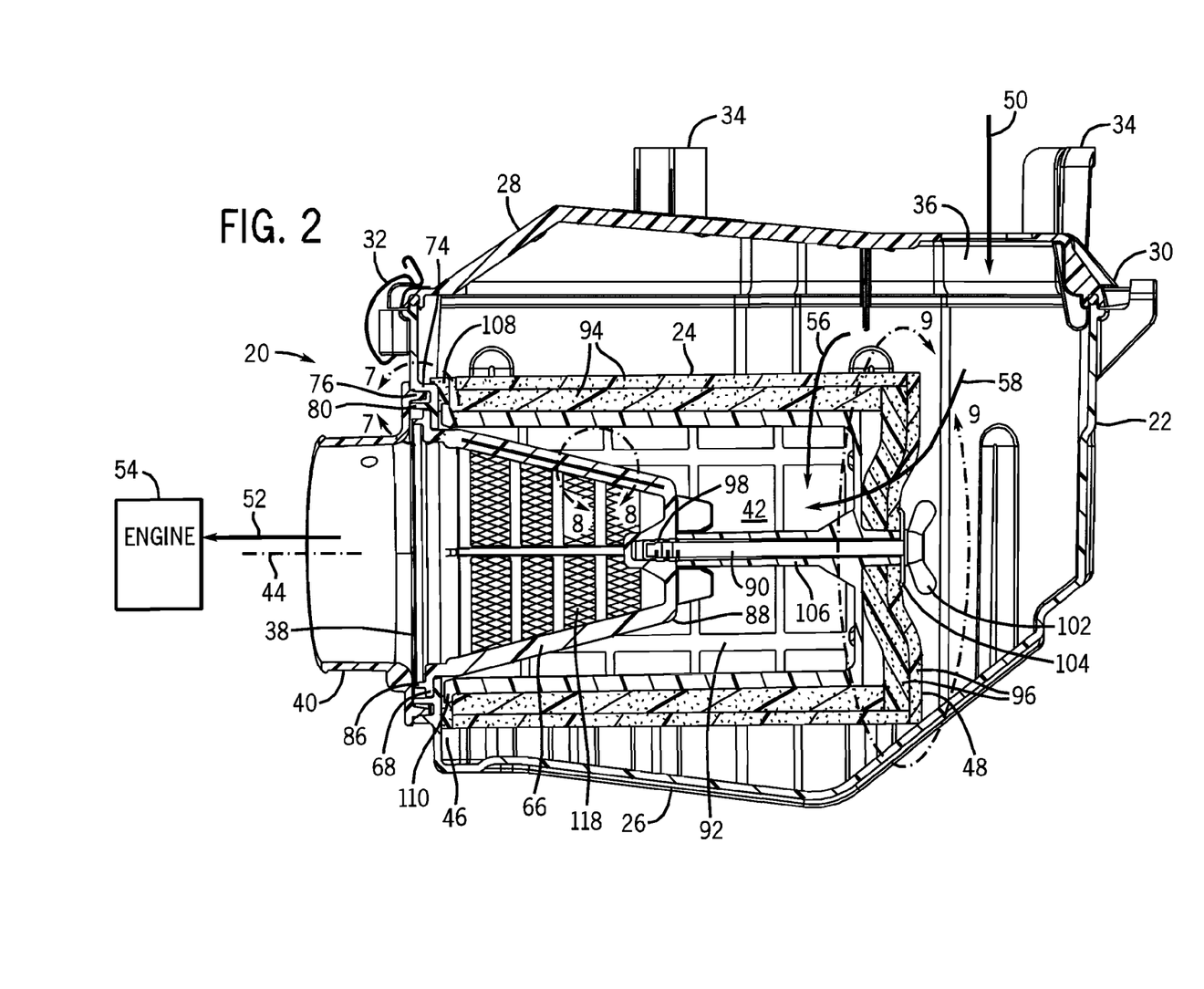
FIG. 2 is a sectional view taken along line 2-2 of FIG. 1.
Figure 12:
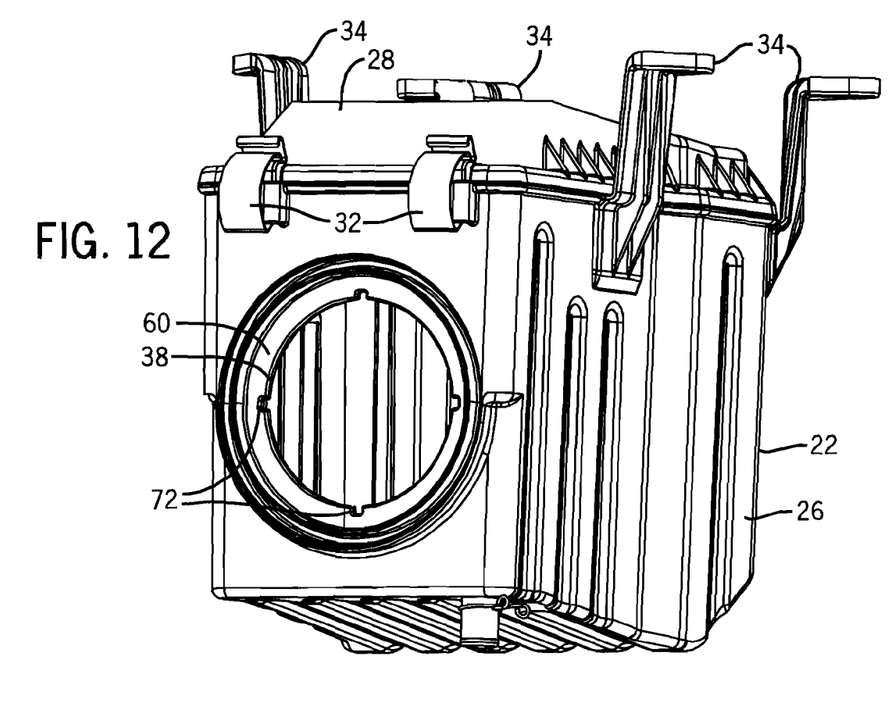
FIG. 12 is a perspective view of the housing of FIG. 1 from a different angle.

FIG. 1 shows a filter assembly 20 including a housing 22 having a filter element 24, FIG. 2, mounted therein. The housing is provided by an open-topped base 26 closed by a cover 28 hinged to the base at hinges 30 and latched at the opposite end by latches 32. The base has brackets such as 34 for mounting the assembly in a vehicle engine compartment, for example. Housing 22 has inlet and outlet ports 36 and 38, FIGS. 1, 2, 12, communicating fluid flow into and out of the housing and through filter element 24 for filtering thereby. A conduit 40, FIGS. 1, 2, mates with one of the ports and conducts fluid flow therethrough. In the preferred embodiment, filter assembly 20 is an air cleaner having an annular filter element 24 mounted therein, which annular filter element has a hollow interior 42 extending axially along an axis 44 between first and second axial ends 46 and 48. Port 36 of the housing is an air inlet port receiving intake air as shown at arrow 50, and port 38 is an outlet port discharging filtered air as shown at arrow 52 to internal combustion engine 54. Axial end 46 of the filter element is an outlet end and communicates with outlet port 38 of the housing. Conduit 40 is an outlet tube mating with outlet port 38 of the housing and conducting fluid flow therethrough as shown at arrow 52. Referring to FIG. 2, incoming air flows laterally radially as shown at arrow 50 into the housing through inlet port 36 and then can flow both radially laterally inwardly through the filter element as shown at arrow 56 and also axially through the filter element as shown at arrow 58 into hollow interior 42 and then axially leftwardly through outlet port 38 and outlet tube 40 as shown at arrow 52 as clean filtered air to engine 54.

Outlet tube 40 mates with outlet port 38 of the housing and conducts fluid flow therethrough as shown at arrow 52. Outlet port 38 and outlet tube 40, FIG. 7, have respective first and second facing surfaces 60 and 62 spaced by a gap 64 therebetween. The assembly further includes a flame arrestor 66, FIGS. 2, 3, 7, 11, through which air flows and which arrests a flamefront flowing from outlet tube 40 back toward filter element 24, e.g. which flamefront may be caused by a backfire from engine 54. Flame arrestor 66 has a mounting flange 68 extending laterally radially into gap 64 in trapped relation to mount flame arrestor 66 to outlet port 38 and outlet tube 40 at the interface thereof.

Figure 3:
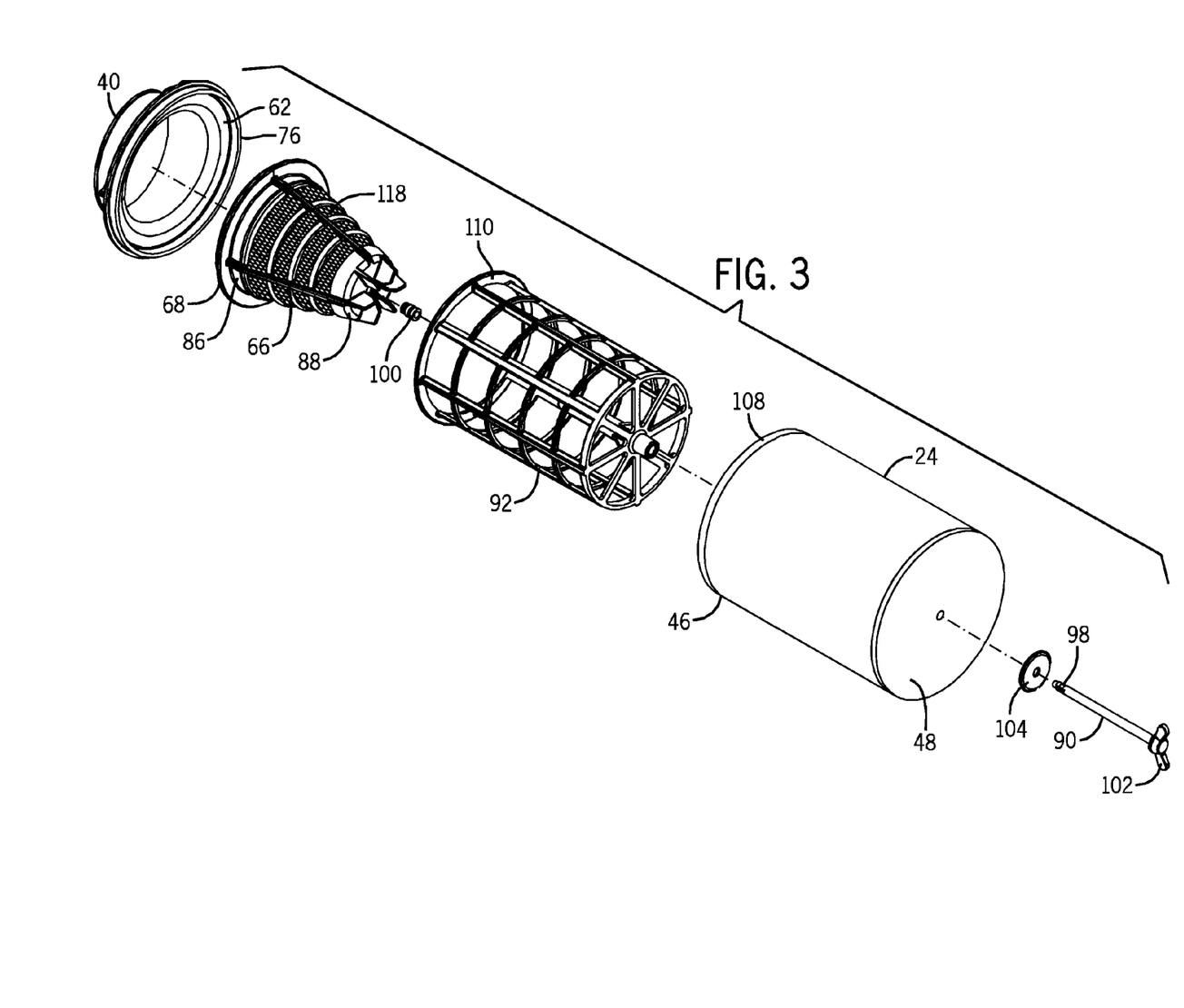
FIG. 3 is an exploded perspective view of a portion of FIG. 2.
Figure 11:
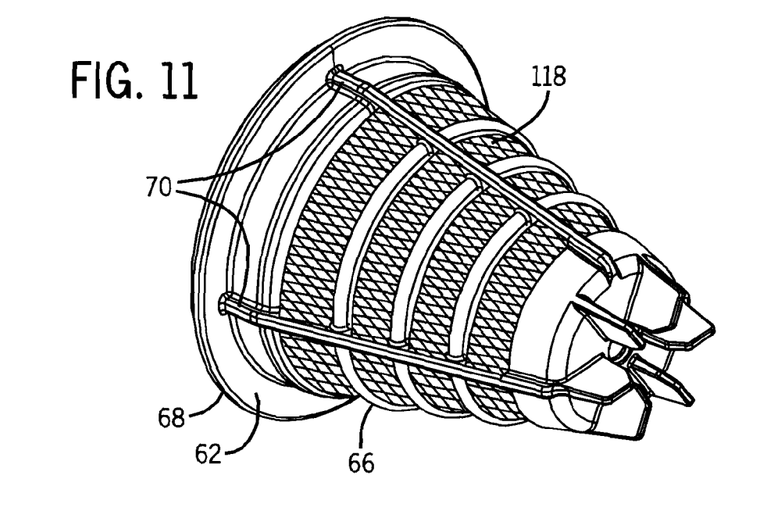
FIG. 11 is an enlarged view of a component of FIG. 3.

Flame arrestor 66, FIGS. 2, 3, 11, is provided by a frusto-conical cage extending from mounting flange 68 at outlet port 38 into hollow interior 42 within filter element 24. The frustoconical cage tapers to a laterally narrower dimension within hollow interior 42 of filter element 24. Air flows axially along axis 44 through flame arrestor 66, outlet port 38, and outlet tube 40, at the interface thereof. Axially facing surfaces 60 and 62, FIG. 7, axially face each other across gap 64 extending axially therebetween. Facing surfaces 60 and 62 trap mounting flange 68 axially therebetween and prevent axial escape of mounting flange 68. Mounting flange 68 and one of the facing surfaces, preferably facing surface 60, FIG. 12, have radially extending detents 70 and 72, respectively, FIGS. 11, 12, engaging each other in axially overlapped relation in interfering manner to prevent rotation of flame arrestor 66 about axis 44. Detents 72 of facing surface 60 are provided by radial slots. Detents 70 of mounting flange 68 are provided by radially and axially extending ribs received in respective slots 72 in interlocked relation preventing rotation of flame arrestor 66 about axis 44.

Figure 7:
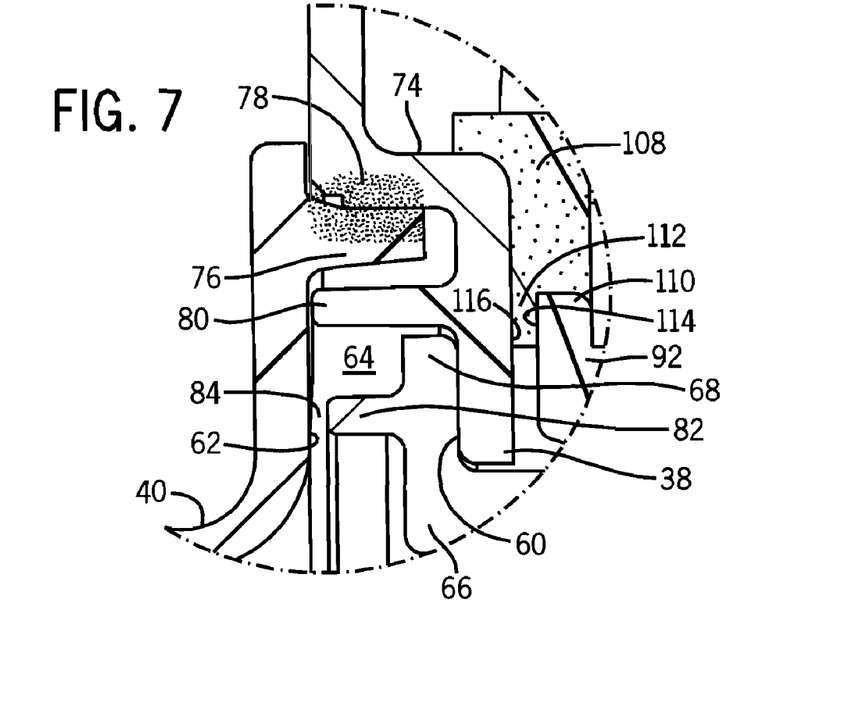
FIG. 7 is like FIG. 6 and is an enlarged view of a portion FIG. 2 at line 7-7 after tightening.

Facing surface 60 of outlet port 38 of the housing has an annular lip 74, FIGS. 2, 7, radially outward of mounting flange 68 of the flame arrestor relative to axis 44 and extending from facing surface 60 axially in a first axial direction, leftwardly in FIGS. 2, 7, toward facing surface 62 of outlet tube 40. Facing surface 62 of outlet tube 40 has a second annular lip 76 radially outward of mounting flange 68 relative to axis 44 and extending from facing surface 62 axially in a second axial direction, rightwardly in FIGS. 2, 7, toward facing surface 60 of outlet port 38. The noted second axial direction is opposite to the noted first axial direction. Annular lips 74 and 76 engage each other in mating bonded relation as shown at 78. In the preferred embodiment, outlet port 38 and outlet tube 40 at respective annular lips 74 and 76 are mounted to each other in spin welded bonded relation. In another embodiment, the outlet port and outlet tube are mounted to each other in sonic welded bonded relation. In another embodiment, the outlet port and outlet tube are mounted to each other in vibration welded bonded relation. In another embodiment, the outlet port and outlet tube are mounted to each other in adhesively bonded relation. In another embodiment, the outlet port and outlet tube are mounted to each other in permanent snap-fit bonded relation. In another embodiment, the outlet port and outlet tube are mounted to each other in laser welded bonded relation. In another embodiment, the outlet port and outlet tube are mounted to each other in hot plate welded bonded relation. In another embodiment, the outlet port and outlet tube are mounted to each other in infrared welded bonded relation. In another embodiment, the outlet port and outlet tube are mounted to each other in heat-staking welded bonded relation. Further in the preferred embodiment, facing surface 60 of outlet port 38 has another annular lip 80, FIGS. 2, 7, extending axially leftwardly therefrom and provides a flash dam or trap blocking leakage or flow radially inwardly therepast of melted plastic from the spin welding of annular lips 74 and 76 to each other at 78. Mounting flange 68 of flame arrestor 66 has an annular lip 82 radially inward of annular lips 74, 76, 80, and extending from mounting flange 68 axially in the noted first axial direction, leftwardly in FIG. 7, in gap 64, which annular lip 82 may be axially spaced from facing surface 62 by axial sub-gap 84 allowing some axial play of lip 82 in gap 64.

Figure 4:
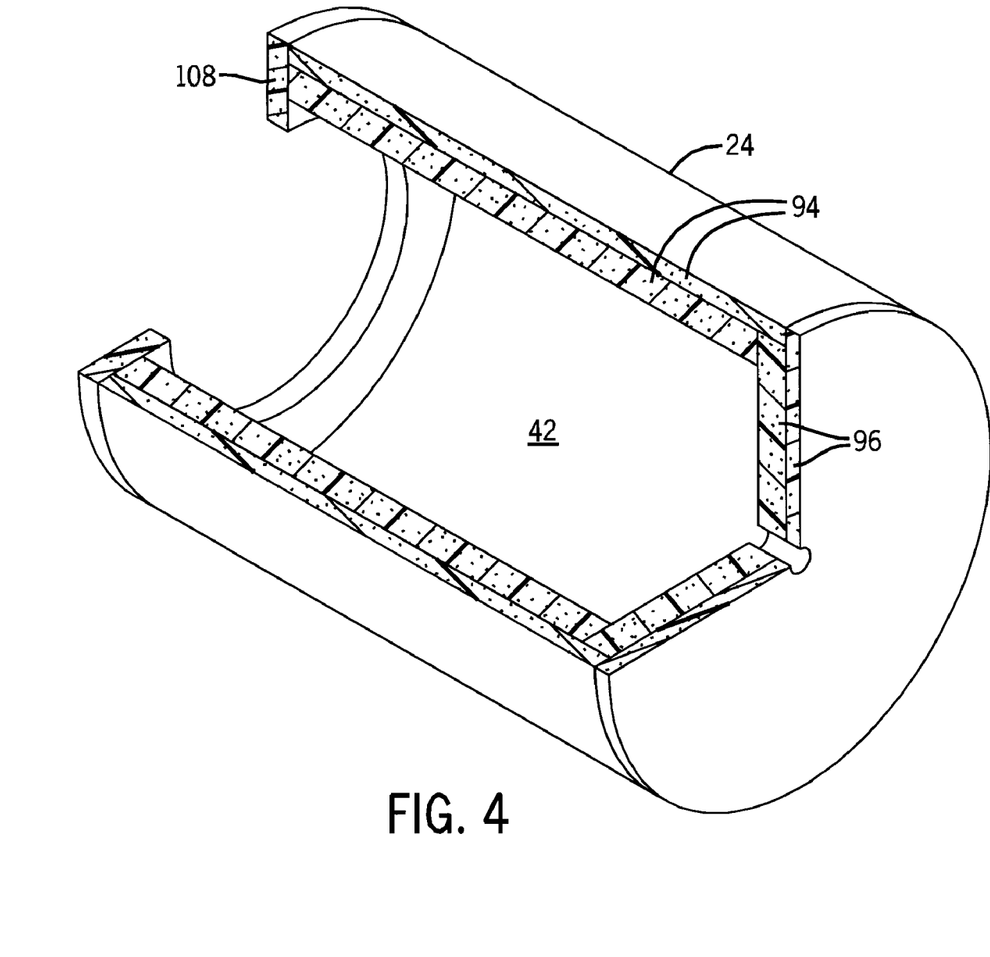
FIG. 4 is an enlarged view partially cut away of a component of FIG. 3.
Figure 5:
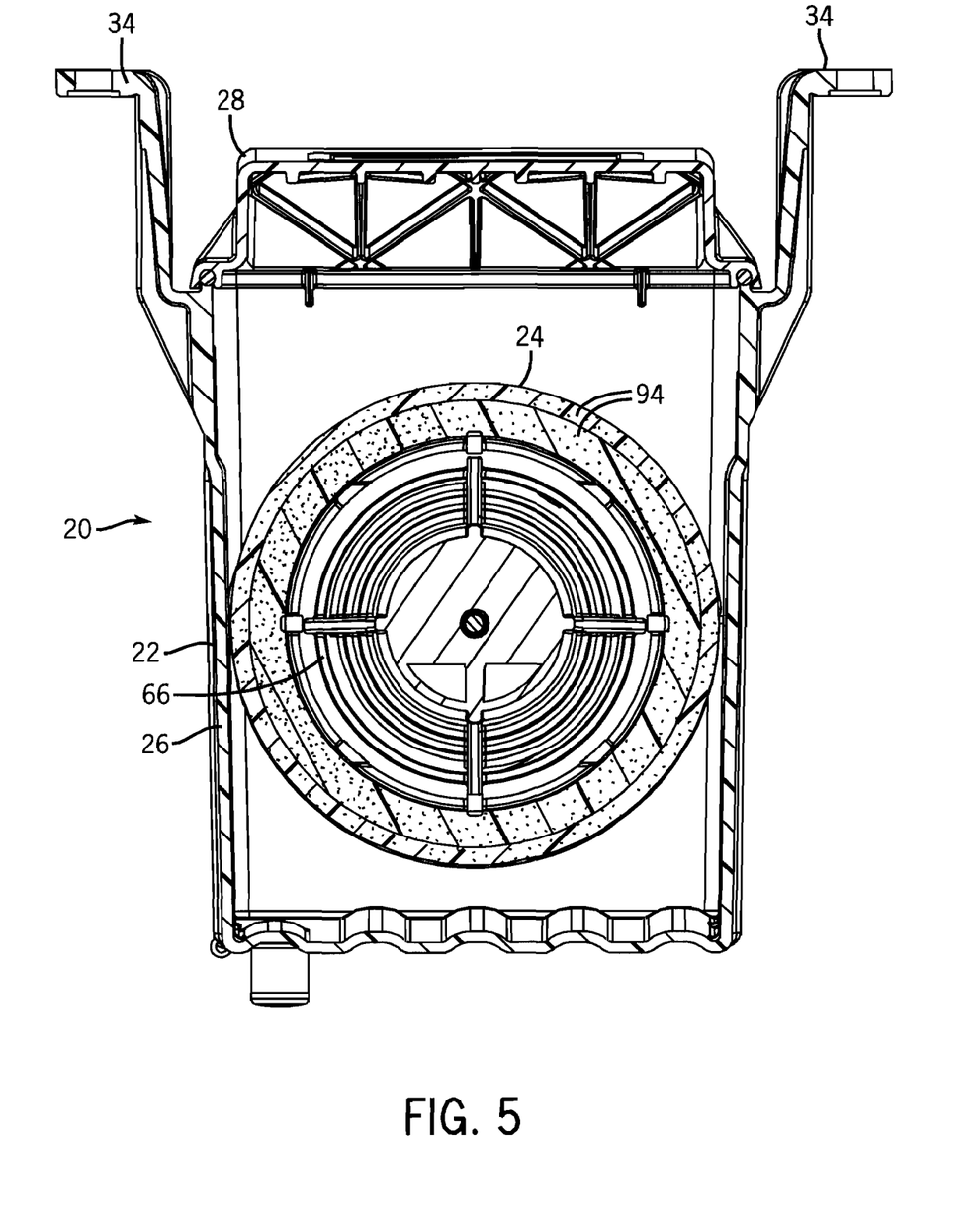
FIG. 5 is a sectional view taken along line 5-5 of FIG. 1.
Figure 6:
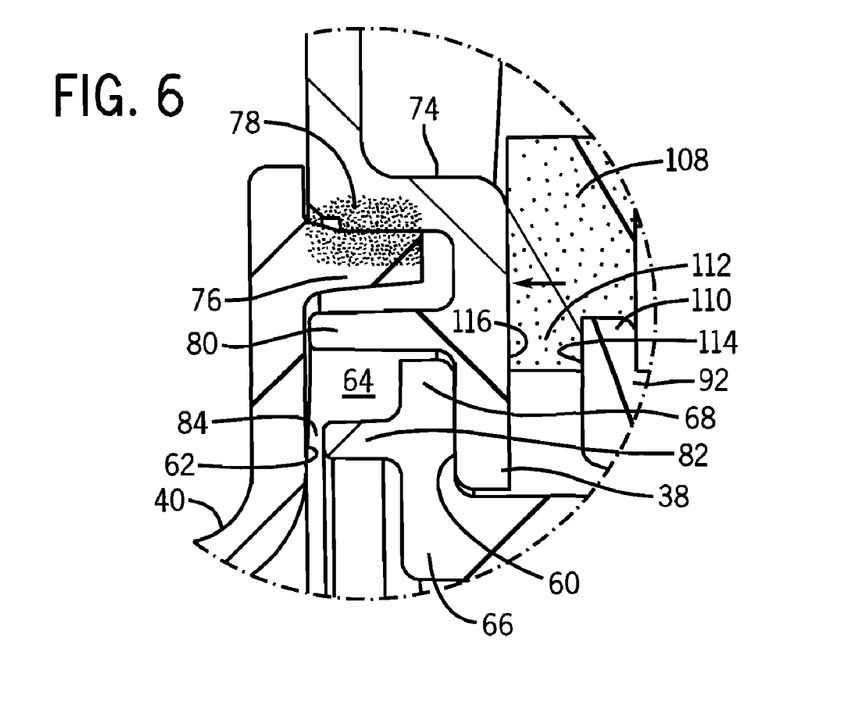
FIG. 6 is an enlarged view of a portion of FIG. 2 prior to tightening.
Figure 8:
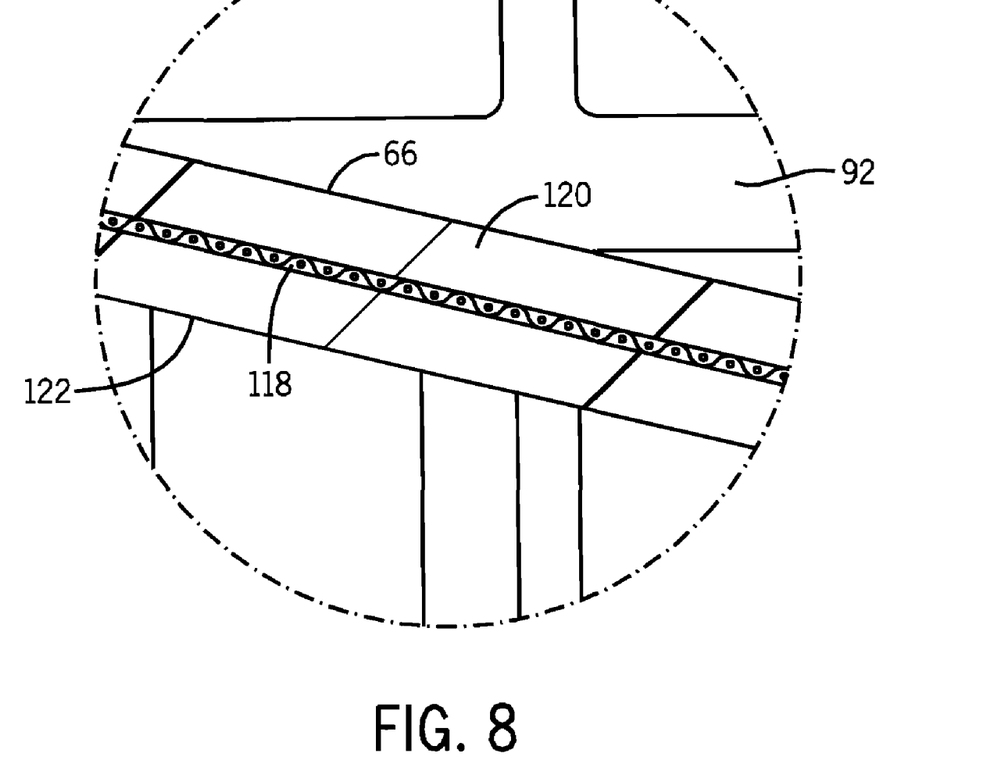
FIG. 8 is an enlarged view of a portion of FIG. 2 at line 8-8.
Figure 9:
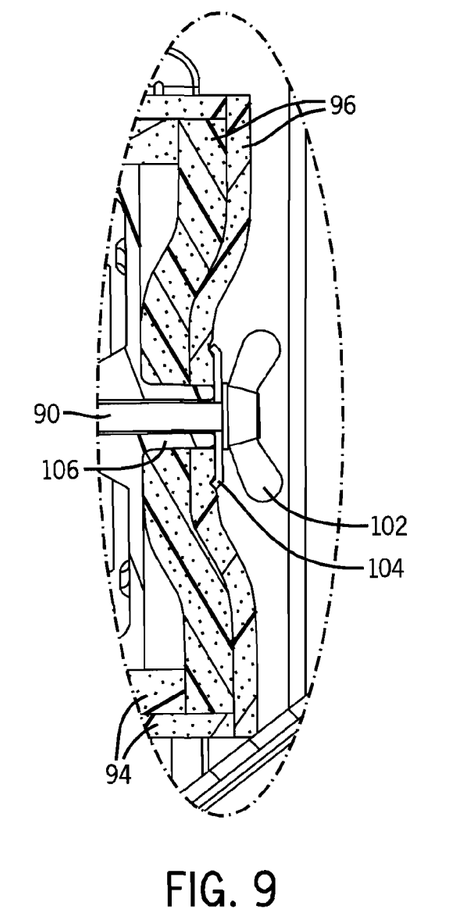
FIG. 9 is an enlarged view of a portion of FIG. 2 at line 9-9.
Figure 10:
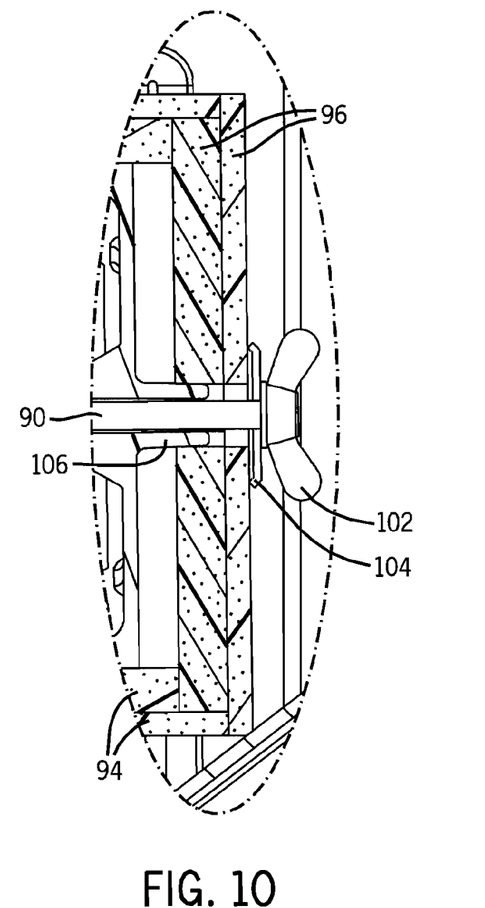
FIG. 10 is like FIG. 9, but in a pre-tightened condition.

Flame arrestor 66, FIGS. 2, 3, has a first axial end 86 at mounting flange 68, and has a distally opposite second axial end 88 axially facing second axial end 48 of filter element 24 and mounted thereto in axially tightened relation by an axial tension member 90 extending axially between second axial end 88 of flame arrestor 66 and second axial end 48 of filter element 24. Axial tension member 90 mounts axial end 88 of the flame arrestor to axial end 48 of the filter element in axially tensioned relation and axially biases mounting flange 68 of the flame arrestor against facing surface 60 of outlet port 38 of the housing, and takes-up any axial play at sub-gap 84. Filter element 24 preferably includes an inner cage 92, FIG. 3, providing axial and radial support for one or more outer annular filter media layers 94 and axial end layers 96, e.g. foam, FIGS. 2, 4, 5. In the preferred embodiment, axial tension member 90 is a wing bolt having a leftward axial end 98 threadingly engaging a threaded insert 100 threaded into or otherwise captured in the axial end 88 of flame arrestor 66, and having a distally opposite rightward winged axial end 102 for axial tightening against washer or disc 104 from the pre-tightened condition of FIG. 6 to the axially tightened condition of FIG. 7. Inner support cage 92 may include a central axial guide bore 106 for guiding bolt 90 therethrough. Foam filter media layers 94, 96 are pre-assembled to each other, e.g. by gluing, and then slid as a cup-like member axially leftwardly over and around cage 92. The left rim of such cup-like member includes an annular foam lip 108, FIG. 4, which, during the noted leftward sliding of the cup-like filter member, is stretched radially outwardly to fit past the leftward flange 110 of cage 92. Annular foam lip 108 then forms a gasket or seal 112, FIG. 7, axially compressed between surface 114 of flange 110 of cage 92 and surface 116 of outlet port 38 of the housing upon tightening of wing bolt 90 from the condition of FIG. 10 to the condition of FIG. 9, which in turn compresses annular foam lip gasket seal 108 from the condition of FIG. 6 to the condition of FIG. 7. Flame arrestor 66 preferably includes a metal wire mesh or screen 118, FIGS. 3, 8, 11, for arresting the flamefront. The screen is preferably embedded between tapering ribs 120 of the frustoconical cage 122 of the flame arrestor, FIG. 8, during molding of the latter, though other flame arrestor configurations are possible. The system provides a filter assembly, such as an air cleaner, with an integrally captured flame arrestor.

The mounting system is applicable to various filter assemblies for filtering fluid flow therethrough, for simply, reliably, cost-effectively, trappingly mounting an auxiliary flow component through which fluid flows, in addition to fluid flow through filter element 24. In such application, auxiliary flow component 66 has the noted mounting flange 68 extending into gap 64 in trapped relation to mount auxiliary flow component 66 to one of the noted ports 36 and 38 and to conduit 40 at the respective interface thereof. In the preferred embodiment, port 38 and conduit 40 are mounted to each other with mounting flange 68 therebetween in permanently captured sandwiched relation, all without detachment fasteners.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems, and method steps described herein may be used alone or in combination with other configurations, systems, and method steps. It is to be expected that various equivalents, alternatives, and modifications are possible within the scope of the appended claims.

What is claimed is:

1. A filter assembly comprising a housing, a filter element including filter media mounted in said housing, said housing having inlet and outlet ports communicating fluid flow into and out of said housing and through said filter element for filtering thereby, said filter element being disposed within said housing such that fluid enters said housing through said inlet port and then is filtered by said filter element after having passed through said inlet port, a conduit mating with one of said ports and conducting fluid flow therethrough, said one port and said conduit having respective first and second facing surfaces spaced by a gap therebetween, an auxiliary flow component through which said fluid flows, said auxiliary flow component having a mounting flange extending into said gap in trapped relation to mount said auxiliary flow component to said one port and said conduit at the interface thereof.

2. The filter assembly according to claim 1 wherein said one port and said conduit are mounted to each other with said mounting flange therebetween in permanently captured sandwiched relation, all without detachment fasteners.

3. The filter assembly according to claim 2 wherein said one port and said conduit are mounted to each other in bonded relation.

4. The filter assembly according to claim 3 wherein said one port and said conduit are mounted to each other in spin welded bonded relation.

5. The filter assembly according to claim 3 wherein said bonded relation is selected from the group consisting of: sonic welded bonded relation; vibration welded bonded relation; adhesively bonded relation; permanent snap-fit bonded relation; laser welded bonded relation; hot plate welded bonded relation; infrared welded bonded relation; and heat-staking welded bonded relation.

6. The filter assembly according to claim 1 wherein fluid flows axially along an axis through said auxiliary flow component, said one port, and said conduit, at the interface thereof, said first and second facing surfaces axially face each other across said gap extending axially therebetween and trap said mounting flange axially therebetween and prevent axial escape of said mounting flange, and wherein said mounting flange and one of said facing surfaces have radially extending detents engaging each other in axially overlapped relation in interfering manner to prevent rotation of said auxiliary flow component about said axis.

7. The filter assembly according to claim 6 wherein said detent of said one facing surface comprises a radial slot in said first facing surface of said one port, and said detent of said mounting flange of said auxiliary flow component comprises a radially and axially extending rib received in said slot in interlocked relation preventing rotation of said auxiliary flow component about said axis.

8. The filter assembly according to claim 6 wherein said first facing surface of said one port has a first annular lip radially outward of said mounting flange of said auxiliary flow component relative to said axis and extending from said first facing surface axially in a first axial direction toward said second facing surface of said conduit, and wherein said second facing surface of said conduit has a second annular lip radially outward of said mounting flange of said auxiliary flow component relative to said axis and extending from said second facing surface axially in a second axial direction toward said first facing surface of said one port, said second axial direction being opposite to said first axial direction, said first and second annular lips engaging each other in mating bonded relation.

9. The filter assembly according to claim 8 wherein said mounting flange of said auxiliary flow component has an annular lip radially inward of said first and second annular lips and extending from said mounting flange axially in said first axial direction in said gap.

10. The filter assembly according to claim 8 wherein said first facing surface of said one port has a third annular lip radially outward of said mounting flange of said auxiliary flow component relative to said axis and radially inward of said first and second annular lips and extending from said first facing surface axially in said first axial direction toward said second facing surface of said conduit.

11. The filter assembly according to claim 10 wherein said mounting flange of said auxiliary flow component has an annular lip radially inward of said first and second and third annular lips and extending from said mounting flange axially in said first axial direction in said gap.

12. The filter assembly according to claim 8 wherein said first and second annular lips engage each other in mating spin welded bonded relation.

13. The filter assembly according to claim 8 wherein said bonded relation is selected from the group consisting of: sonic welded bonded relation; vibration welded bonded relation; adhesively bonded relation; permanent snap fit bonded relation; laser welded bonded relation; hot plate welded bonded relation; infrared welded bonded relation; and heat-staking welded bonded relation.

14. The filter assembly according to claim 1 wherein said filter element comprises a cage supporting one or more layers of filter media, said cage having a flange facing said one port, said filter media having a lip compressed between said flange and said one port to form a sealing gasket of said filter media therebetween.

15. A filter assembly with integrally captured flame arrestor comprising a housing, an annular filter element including annular filter media mounted in said housing, said annular filter element having a hollow interior and extending axially along an axis between first and second axial ends, said housing having inlet and outlet ports communicating air flow into and out of said housing and through said filter element for filtering thereby, said annular filter element being disposed within said housing such that air flow enters said housing through said inlet port and this is filtered by said annular filter element after having passed through said inlet port, said first axial end of said annular filter element being an outlet and communicating with said outlet port of said housing, an outlet tube mating with said outlet port of said housing and conducting air flow therethrough, said outlet port and said outlet tube having respective first and second facing surfaces spaced by a gap therebetween, a flame arrestor through which air flows and which arrests a flamefront flowing from said outlet tube toward said annular filter element, said flame arrestor having a mounting flange extending into said gap in trapped relation to mount said flame arrestor to said outlet port and said outlet tube at the interface thereof.

16. The filter assembly with integrally captured flame arrestor according to claim 15 wherein said flame arrestor comprises a frustoconical cage extending from said mounting flange at said outlet port axially into said hollow interior within said annular filter element, said frustoconical cage tapering to a laterally narrower dimension within said hollow interior of said filter element.

17. The filter assembly with integrally captured flame arrestor according to claim 15 wherein air flows axially along said axis through said flame arrestor, said outlet port, and said outlet tube, at the interface thereof, said first and second facing surfaces axially face each other across said gap extending axially therebetween and trap said mounting flange axially therebetween and prevent axial escape of said mounting flange, and wherein said mounting flange and one of said facing surfaces have radially extending detents engaging each other in axially overlapped relation in interfering manner to prevent rotation of said flame arrestor about said axis.

18. The filter assembly with integrally captured flame arrestor according to claim 17 wherein said first facing surface of said outlet port has a first annular lip radially outward of said mounting flange of said flame arrestor relative to said axis and extending from said first facing surface axially in a first axial direction toward said second facing surface of said outlet tube, and wherein said second facing surface of said outlet tube has a second annular lip radially outward of said mounting flange of said flame arrestor relative to said axis and extending from said second facing surface axially in a second axial direction toward said first facing surface of said outlet port, said second axial direction being opposite to said first axial direction, said first and second annular lips engaging each other in mating bonded relation.

19. The filter assembly with integrally captured flame arrestor according to claim 18 wherein said mounting flange of said flame arrestor has a third annular lip radially inward of said first and second annular lips and extending from said mounting flange axially in said first axial direction in said gap.

20. The filter assembly with integrally captured flame arrestor according to claim 15 wherein said flame arrestor has a first axial end at said mounting flange, and has a second axial end facing said second axial end of said annular filter element and mounted thereto in axially tightened relation.

21. The filter assembly with integrally captured flame arrestor according to claim 20 comprising an axial tension member extending axially between said second axial end of said flame arrestor and second axial end of said annular filter element and mounting said second axial end of said flame arrestor to said second axial end of said annular filter element in axially tensioned relation and axially biasing said mounting flange of said flame arrestor against said first facing surface of said outlet port.

\* \* \* \* \*